United States Patent [19]

Durand et al.

[11] Patent Number: 4,503,182

[45] Date of Patent: Mar. 5, 1985

[54] COPOLYMERS USEFUL AS ADDITIVES FOR LOWERING THE CLOUD POINT OF MIDDLE HYDROCARBON DISTILLATES, AND COMPOSITIONS OF MIDDLE HYDROCARBON DISTILLATES COMPRISING THEM

[75] Inventors: Jean-Pierre Durand, Chatou; François Dawans, Bougival; Bernard Damin, Oullins; Robert Léger, Grigny, all of France

[73] Assignees: Institut Francais du Petrole, Rueil-Malmaison; Elf France, Paris, both of France

[21] Appl. No.: 502,023

[22] Filed: Jun. 7, 1983

Foreign Application Priority Data

Jun. 7, 1982 [FR]  France ................. 82 09997

[51] Int. Cl.$^3$ .................... C08K 5/01; C08F 8/32
[52] U.S. Cl. ..................... 524/474; 524/549;
  525/327.6; 525/329.5; 525/329.6; 525/379;
  525/381; 525/382
[58] Field of Search ........... 525/327.6, 329.5, 379.6;
  524/474, 549

[56] References Cited

U.S. PATENT DOCUMENTS 4,359,325 11/1982 Dawans et al. ............. 526/304

Primary Examiner—Joseph L. Schofer
Assistant Examiner—Bernard Lipman
Attorney, Agent, or Firm—Millen & White

[57] ABSTRACT

Products useful as additives for lowering the cloud point of middle distillates have a molecular weight from 1,000 to 50,000, and are obtained by reacting a compound of the formula

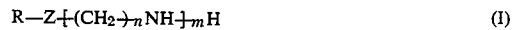

or

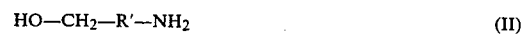

where R is a monovalent saturated aliphatic radical of 1–30 carbon atoms, Z is —NH— or oxygen, n is 2 to 4, m is zero or 1 to 4 and R' is a saturated divalent aliphatic radical of 1–18 carbon atoms, with a copolymer comprising recurrent units (A) from an alkyl ester of an unsaturated monocarboxylic acid and/or a vinyl ester of a saturated monocarboxylic acid, recurrent units (B) from diisobutylene and recurrent units (C) from an unsaturated α,β-dicarboxylic compound.

16 Claims, No Drawings

COPOLYMERS USEFUL AS ADDITIVES FOR LOWERING THE CLOUD POINT OF MIDDLE HYDROCARBON DISTILLATES, AND COMPOSITIONS OF MIDDLE HYDROCARBON DISTILLATES COMPRISING THEM

BACKGROUND OF THE INVENTION

The invention relates to new nitrogen-containing additives for use as depressants of the cloud point of middle hydrocarbon distillates (fuel oils, gas oils), as well as to compositions of middle distillates containing said additives.

The petroleum distillates concerned by the invention consist of middle distillates (fuel oils, gas oils) whose distillation range (standard ASTM D 86-67) is between 150° C. and 450° C. The more particularly concerned gas oils have a distillation interval ranging from an initial temperature between 160° and 190° C. to a final temperature between 350° and 390° C.

A great number of products have been marketed, aiming to improve the limit filterability temperature and the pour point of petroleum cuts of high paraffin content, such as, for example:
polymers based on long chain olefins,
copolymers based on alpha-olefins,
ethylene-vinyl acetate copolymers,
N-acylaminoethyl esters of acid-containing polymers, or
halocarbon compounds.

These products act on the kinetic and crystallization phenomena and modify the size of the crystals, allowing the use of the suspension at a lower temperature without plugging of the pipes and filters. The above products do not modify the temperature at which the first paraffin crystals appear. As a matter of fact, it has been considered up to now that this temperature was a datum depending on the molecular weight and the formula of the paraffins and on the nature of the solvent.

Decreasing the cloud point of middle distillates (particularly gas oils) by means of an additive would be very advantageous to the refiners since it would make it possible, without modification of the distillation flow sheet, to meet the specifications which tend now to be more and more severe.

It has now been discovered that certain chemical compounds, whose definition is given hereunder, have the property, when added to middle distillates, to cause the first paraffin crystals to appear at a temperature lower than that at which these crystals appear in the absence of these additives. This property is the more unobvious as it is retained after several heating and cooling cycles and it results from a yet unexplained mechanism.

This class of chemical compounds also has an effect on other properties of middle distillates (particularly gas oils), by modifying the behavior of the medium containing the settled paraffins.

Thus, the compounds of the invention have an important effect on the limit filterability temperature and the pour point.

When paraffin crystals, whose formation results from cooling, have appeared, their normal tendency is to gather by gravity at the bottom. This phenomenon, usually known as sedimentation, results in the plugging of ducts and filters and is detrimental to an accurate use of middle distillates, particularly of gas oils. The chemical compounds of the invention can substantially reduce the settling rate of the paraffins formed by cooling of gas oils and other middle distillates.

Finally, the products of the invention, which possess the above properties, also impart to gas oils and middle distillates to which they are added anti-corrosion properties towards metal surfaces.

The use of certain copolymers as additives decreasing the pour point of a number of hydrocarbon oils, particularly middle distillates, such as gas oils and fuel oils, has been described in the published French patent application No. 2 471 405. These copolymers consisted particularly of terpolymers formed of:

(A) recurrent units derived from vinylic or acrylic esters,
(B) recurrent units derived from diisobutylene, and
(C) recurrent units derived from an unsaturated $\alpha,\beta$-dicarboxylic compound.

The latter consisted of anhydrides, dicarboxylic acids, diesters or imides N-substituted with hydrocarbon radicals, optionally further comprising at least one amine group and/or at least one hydroxy group. The N-substituted imide elements illustrated in this patent application resulted chiefly from the condensation of N,N-dimethyl 1,3-propane diamine on vicinal anhydrides, diacids or diesters groups present in the terpolymer.

SUMMARY OF THE INVENTION

It has now been discovered that terpolymers comprising N-substituted imide groups, obtained by condensing at least one compound of one of the following general formulas (I) and (II):

  (I)

and $$HO-H_2C-R'-NH_2 \qquad (II)$$

with the anhydride vicinal diacids or diesters groups present in the previously described terpolymers, not only decrease the pour point of middle distillates but also substantially decrease the cloud point of these distillates and improve their limit filterability temperature.

DETAILED DISCUSSION

In the formula (I), R is a monovalent saturated aliphatic radical of 1 to 30 carbon atoms, Z can be, according to the case, an oxygen atom or can represent a divalent group —NH—, n is an integer from 2 to 4 and m can be zero, when Z is —NH—, or an integer from 1 to 4, in any case.

The compounds of the above formula (I) may consist of primary amines of the formula R—NH$_2$ (in that case, in the formula (I), Z represents the group —NH— and m is zero); preferably, the radical R is linear and comprises 12 to 24 carbon atoms. Examples of these amines are: dodecylamine, tetradecylamine, hexadecylamine, octadecylamine, eicosylamine and docosylamine.

The compounds of the formula (I) may also consist of polyamines derived from saturated aliphatic amines of the formula:

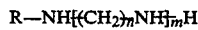

corresponding to the general formula (I) wherein Z represents the group —NH—, m may have a value from 1 to 4 and n a value from 2 to 4, preferably 3. Preferably the radical R is linear and comprises 12 to 24 carbon atoms. Specific compounds are: N-dodecyl 1,3-diamino propane, N-tetradecyl 1,3-diamino propane, N-hexadecyl 1,3-diamino propane, N-octadecyl 1,3-diamino propane, N-octadecyl 1,3-diamino propane, N-eicosyl 1,3-diamino propane, N-docosyl 1,3-diamino propane, N-hexadecyl dipropylene triamine, N-octadecyl dipropylene triamine, N-eicosyl dipropylene triamine and N-docosyl tripropylene triamine.

Finally, the compounds of the formula (I) involved in the invention can consist of ether-amines, particularly those of the formula:

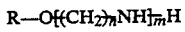

corresponding to the general formula (I) wherein Z is an oxygen atom; preferably, the radical R is linear and comprises 12 to 24 carbon atoms; m is an integer from 1 to 4 and n is an integer from 2 to 4, preferentially 2 or 3.

Specific compounds of the ether amine type are: 2-methoxy ethylamine, 3-methoxy propylamine, 4-methoxy butylamine, 3-ethoxy propylamine, 3-octyloxy propylamine, 3-decyloxy propylamine, 3-hexadecyloxy propylamine, 3-eicosyloxy propylamine, 3-docosyloxy propylamine, N-(3-octyloxy propyl)1,3-diamino propane, N-(3-decyloxy propyl)1,3-diamino propane, 3-(2,4,6-trimethyl decyl)oxy propylamine, and N-[3-(2,4,6-trimethyl decyl)oxy propyl]1,3-diamino propane.

The compound having a primary amine function which is used to prepare the additives of the invention can also consist of an aminoalcohol of the general formula (II):

$$HO-CH_2-R'-NH_2 \qquad (II)$$

where R' is a linear or branched divalent saturated aliphatic radical, preferably a linear radical, comprising 1 to 18 carbon atoms.

Specific examples thereof are: monoethanolamine, 1-amino 3-propanol, 1-amino 4-butanol, 1-amino 5-pentanol, 1-amino 6-hexanol, 1-amino 7-heptanol, 1-amino 8-octanol, 1-amino 10-decanol, 1-amino 11-undecanol, 1-amino 13-tridecanol, 1-amino 14-tetradecanol, 1-amino 16-hexadecanol, 2-amino 2-methyl 1-propanol, 2-amino 1-butanol and 2-amino 1-pentanol.

It must be understood that the use of one or more compounds of the formula (I) and/or one or more compounds of the formula (II) is not outside the scope of the invention.

The terpolymers which are used to prepare the additives of the invention have a number average molecular weight of about 1 000 to 50 000 and usually comprise:
10 to 90%, preferably 15 to 70%, by mole, of recurrent units (A) (derived from vinyl esters or acrylic esters).
5 to 40%, preferably 15 to 40%, by mole, of recurrent units (B) (derived from diisobutylene).
5 to 50%, preferably 15 to 45%, by mole, of recurrent units (C) (derived from an α,β-unsaturated dicarboxylic compound).

The (C) units content of these terpolymers is advantageously at least the same as that of the (B) units.

To illustrate the unsaturated monoesters from which are derived the units (A) of the terpolymers contemplated in the invention, there can be mentioned vinyl acetate and the alkyl acrylates and methacrylates having from 1 to 24 carbon atoms in the alkyl group, such as the methyl, propyl, butyl, ethylhexyl, decyl, dodecyl, hexadecyl, octadecyl, eicosyl or docosyl acrylates or methacrylates. There can also be mentioned the acrylates and methacrylates of industrial alcohol cuts comprising, as an average, 12 carbon atoms (lauryl acrylate and methacrylate) or 18 carbon atoms (stearyl acrylate and methacrylate), as well as cuts of heavier alcohols having a high content of alcohols comprising 20 to 24 carbon atoms.

To illustrate the α,β-unsaturated dicarboxylic compounds from which are derived the units (C) of the terpolymers contemplated in the invention, there can be mentioned the maleic and citraconic anhydrides and acids, the fumaric and mesaconic acids, and the corresponding derivatives having at least one ester function.

The preferred mode of synthesis of the additives conforming to the invention consists of, in a first step, conducting the radical terpolymerization of one or more unsaturated monoesters with a mixture of maleic anhydride or acid and diisobutylene. The so-formed reaction mixture is reacted, in a second step, with at least one compound corresponding to the general formulas (I) and (II).

The manufacture of the terpolymers can be conducted by the conventional methods of radical-promoted polymerization, for example in the presence of an initiator of the azobisisobutyronitrile or peroxide type, in solution in a hydrocarbon solvent, such as, for example, cyclohexane, isooctane, dodecane, benzene, toluene, xylene or diisopropylbenzene, or also tetrahydrofuran or dioxane. Hydrocarbon cuts having a relatively high boiling point, such as kerosene or gas oil, can advantageously be used. The operation is generally performed under atmospheric pressure at a temperature not in excess of 150° C., for example between 60° and 120° C.

Appropriate proportions of the various monomers are used; as a rule, there is used a molar proportion of the α,β-dicarboxylic compound having an ethylenic unsaturation (for example maleic anhydride) at least equal to the molar proportion of diisobutylene.

The proportion of solvent to be used is usually such that the concentration by weight of dry substance is between 25 and 70% and preferably averages 50%.

The compound of formula (I) and/or (II) is generally added to the solution of copolymer obtained as described above in a molar proportion corresponding approximately to the proportion of the unsaturated diacid, diester or anhydride utilized when preparing the copolymer. This proportion can be, for example, 0.9 to 1.1 mole of compound (I) or (II) per mole of dicarboxylic compound. A greater deficiency of the compound of formula (I) or (II) can also be used. The proportion can then be as low as, for example, 0.5 mole per mole of dicarxylic compound introduced into the copolymer.

The reaction is performed by heating the mixture at a temperature between 75° and 130° C., preferably between 80° and 100° C., the reaction time being between about 1 and 6 hours, a time of about 2 h being generally sufficient. The reaction of the products of the formula (I) or (II) with the units (C) of the copolymer yields imide groups (succinimides), this reaction being concomitant with the formation of water or alcohol, depending on the nature of the dicarboxylic groups (diacid, anhydride or diester). If desired, the formed volatile products can be withdrawn from the reaction mixture either by scavenging with an inert gas, such as, for example, nitrogen or argon, or by azeotropic distillation with the selected solvent.

Another particular manner to synthesize the additives contemplated in the invention may consist in certain cases in conducting the radical terpolymerization of one or more esters of unsaturated monocarboxylic acids with a mixture of diisobutylene and N-substituted maleimides. The latter are obtained by prior reaction of the above compounds of formula (I) or (II) with a compound such as maleic anhydride.

The additives are obtained as a solution in the selected solvent and can be used directly as such in middle distillate oils (particularly in gas oils) whose cloud point must be improved.

Although the mechanism by which these additives act on the temperature at which paraffin crystals appear in middle distillates has not yet been clearly elucidated, a substantial improvement of the average distillates treated with these additives is observed when they are added at concentrations of, for example, 0.001 to 1% b.w., and preferably 0.01 to 0.2%. The decrease of the cloud point can be, for example, 5° C. or more.

It is remarkable to observe that the additives of the invention, which efficiently improve the cloud point of the middle distillates, have also the property of inhibiting the settling of n-paraffins in average distillates at rest, of improving the limit filterability temperature and the pour point, and of inhibiting the corrosion of metal surfaces contacted with these distillates.

The following examples illustrate the invention but do not limit the scope thereof.

EXAMPLE 1

2 g of azo-bis-isobutyronitrile are added to a solution of 85 g of a mixture of alkyl acrylates (comprising about 5% of stearyl acrylate, 30% of eicosyl acrylate and 25% of behenyl acrylate), 7.5 g of maleic anhydride and 7.5 g of diisobutylene in 300 g of toluene; the mixture is stirred at 90° C. for 2 hours. 21.5 g of a commercial cut of primary fatty amines comprising about 71% of stearylamine, 28% of palmitylamine and 1% of myristylamine are added to the resultant reaction mixture. The reaction mixture is stirred at 90° C. for 2 hours.

The product is then diluted to bring its dry substance content to 50% b.w.; it constitutes additive I.

EXAMPLE 2

2 g of azo-bis-isobutyronitrile are added to a solution of 70 g of the acrylate mixture of example 1, 15 g of maleic anhydride and 15 g of diisobutylene in 100 g of toluene. The mixture is stirred for 2 hours at 90° C. 43 g of the commercial cut of primary fatty amines of example 1 are added to the resultant mixture. The mixture is stirred for 4 hours at the toluene reflux and diluted to bring its concentration of active material back to 50% b.w. Additive II is thus obtained.

EXAMPLE 3

1 g of azo-bis-isobutyronitrile is added to a solution of 50 g of the acrylates mixture of example 1, 25 g of maleic anhydride and 25 g of diisobutylene in 100 g of toluene. The mixture is stirred at 90° C. for 2 hours and then diluted with 72 g of the commercial cut of primary fatty amines of examples 1 and 2. The mixture is stirred for 3 hours at the toluene reflux and diluted to bring its active material content back to 50% b.w. Additive III is thus obtained.

EXAMPLE 4

Anything else unchanged, the 72 g of the commercial cut of primary amines of example 3 are replaced with 95 g of a N-alkyl propylene diamine commercial cut whose alkyl group has the same composition as that of the preceding amine. Additive IV is obtained.

EXAMPLE 5

1 g of azobisisobutyronitrile is added to a solution of 50 g butyl acrylate, 25 g maleic anhydride and 25 g diisobutylene in 100 g of xylene. The mixture is stirred for 2 hours at 90° C. 77 g of a commercial cut of primary fatty amines containing about 1% myristylamine, 5% palmitylamine, 42% stearylamine, 12% arachidylamine and 40% behenylamine is added to the so-obtained mixture. After 5 hours of reaction at xylene reflux and dilution with xylene so as to bring the active material concentration back to 50% b.w., the resultant solution constitutes the additive V.

EXAMPLES 6 TO 8

EXAMPLE 6

All other conditions of example 5 being unchanged, butyl acrylate is replaced with 2-ethyl hexyl acrylate, yielding additive VI.

EXAMPLE 7

All other conditions of example 5 being unchanged, butyl acrylate is replaced with stearyl acrylate, yielding additive VII.

EXAMPLE 8

In the same manner, when replacing butyl acrylate with stearyl methacrylate in example 5, additive VIII is obtained.

EXAMPLES 9 AND 10

EXAMPLE 9

Operating as in example 1 with the same molar proportions as in this example, the cut of primary fatty amines is replaced with N-(3-octyloxy propyl)1,3-diamino propane. Additive IX is obtained.

EXAMPLE 10

The fatty amine cut of example 1 is replaced with an equimolecular proportion of 1-amino 10-decanol, and the operation is conducted as in example 1. The additive X is obtained.

EXAMPLE 11

The activity of the additives of the foregoing examples has been tested on two gas oil cuts of ARAMCO origin, referenced hereinafter as $G_1$ and $G_2$ and whose characteristics are indicated in the following Table I:

TABLE I

| GAS OIL | DISTILLATION ASTM | | % DISTILLED at 350° C. | VOLUME MASS at 150° C. in kg/l |
|---|---|---|---|---|
| | I.P. (°C.) | F.P. (°C.) | | |
| $G_1$ | 181 | 382 | 89 | 0.846 |
| $G_2$ | 186 | 385 | 87 | 0.847 |

The additives I to X have been incorporated in a proportion of 0.1% b.w. to the above gas oil cuts $G_1$ and $G_2$.

Three determinations have been effected with each of the so-formed compositions:
the cloud point according to the standard AFNOR T 60-105.
the limit filterability temperature (FLT) by the method AFNOR M-07-042.
the pour point by the method AFNOR T 60-105.

The results of these determinations are summarized in the following Table II:

TABLE II

| ADDITIVES | CLOUD POINT (°C.) | | FLT (°C.) | | POUR POINT (°C.) | |
|---|---|---|---|---|---|---|
| | $G_1$ | $G_2$ | $G_1$ | $G_2$ | $G_1$ | $G_2$ |
| Without | +2 | +6 | 0 | +3 | −6 | +3 |
| 0.1% I | 0 | +4 | −3 | 0 | −12 | −6 |
| 0.1% II | −1 | +3 | −4 | 0 | −9 | −9 |
| 0.1% III | −3 | +2 | −4 | 0 | −9 | −6 |
| 0.1% IV | −3 | +2 | −4 | −1 | −12 | −9 |
| 0.1% V | −2 | +3 | −3 | 0 | −12 | −6 |
| 0.1% VI | −2 | +2 | −3 | 0 | −9 | −9 |
| 0.1% VII | −3 | +2 | −4 | −1 | −12 | −9 |
| 0.1% VIII | −2 | +2 | −4 | −1 | −12 | −9 |
| 0.1% IX | −2 | +3 | −3 | 0 | −9 | −9 |
| 0.1% X | −1 | +2 | −2 | −1 | −9 | −6 |

EXAMPLE 12

The anti-corrosion effect of the additive I of example 1 is tested in this example.

Product I has been used in two gas oils $G_1$ and $G_2$ described above, at a concentration of 0.01% b.w.

The corrosion test consists of determining the corrosion, induced by synthetic sea water, of steel or polished iron cylindrical test-pieces, according to the ASTM D. 665 standard modified as follows: the temperature is 32.2° C. and the test time is 20 hours.

The two additive-free gas oils $G_1$ and $G_2$ give 100% rusted test-pieces, whereas the two gas oils containing 0.01% b.w. of additive give intact test-pieces (0% rust).

What is claimed is:

1. A composition useful as an additive to decrease the cloud point of middle distillates, consisting essentially of an imidized copolymer having a number average molecular weight of 1,000–50,000, and being (1) the condensation product of a copolymer, comprising: 10–90% by mole of recurrent units (A) derived from at least one alkyl ester of an unsaturated monocarboxylic acid and/or at least one vinyl ester of a saturated monocarboxylic acid; 5–40% by mole of recurrent units (B) derived from diisobutylene; and 5–50% by mole of recurrent units (C) derived from at least one $\alpha,\beta$-unsaturated dicarboxylic compound in the form of a diacid, a lower alkyl diester or an anhydride, with at least one compound having a primary amine group and having the formula:

$$R-Z-[(CH_2)_n NH]_m H \quad (I)$$

wherein R is a monovalent saturated aliphatic radical having 12–24 carbon atoms; Z is NH or O; n is an integer from 2 to 4; and m is zero or an integer from 1 to 4 when Z is NH, or an integer from 1 to 4 when Z is O; or (2) a copolymer, comprising: 10–90% by mole of recurrent units (A) derived from at least one alkyl ester of an unsaturated monocarboxylic acid and/or at least one vinyl ester of a saturated monocarboxylic acid; 5–40% by mole of recurrent units (B) derived from diisobutylene; and 5–50% by mole of recurrent units (C) derived from the condensation product of at least one $\alpha,\beta$-unsaturated dicarboxylic compound in the form of a diacid, a lower alkyl diester or an anhydride, with at least one compound having a primary amine group and having the formula (I) as defined herein.

2. A composition according to claim 1, wherein said imidized copolymer comprises:
15 to 70% by mole of units (A),
15 to 40% by mole of units (B), and
15 to 45% by mole of units (C).

3. A composition according to claim 1, wherein in said imidized copolymer, the content of units (C) is at least equal to the content of units (B).

4. A composition according to claim 1, wherein the alkyl ester of the unsaturated monocarboxylic acid from which the units (A) are derived is at least one alkyl acrylate or methacrylate, whose alkyl group has 1 to 24 carbon atoms.

5. A composition according to claim 1, wherein the vinyl ester of the unsaturated monocarboxylic acid from which the units (A) are derived is vinyl acetate.

6. A composition according to claim 1, wherein the $\alpha,\beta$-unsaturated dicarboxylic compound from which the units (C) are derived is at least one maleic or alkylmaleic acid, a methyl, ethyl or propyl diester of one such acid, or a maleic or alkylmaleic anhydride.

7. A composition according to claim 1, wherein the compound having an amine function (I) is a linear primary monoamine having 12 to 24 carbon atoms, m being zero and Z being NH.

8. A composition according to claim 1, wherein the compound having an amine function (I) is a polyamine of the formula $$R-NH-[(CH_2)_n NH]_m H,$$

wherein R is a linear alkyl radical of 12 to 24 carbon atoms, n is an integer from 2 to 4 and m is an integer from 1 to 4.

9. A composition according to claim 1, wherein the compound having an amine function (I) is an ether-amine of the formula $$R-[O-(CH_2)_n NH]_m H,$$

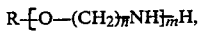

wherein R is a linear alkyl radical of 12 to 24 carbon atoms, n is an integer from 2 to 4 and m is an integer from 1 to 4.

10. A composition according to claim 1, which is obtained by radical copolymerization of appropriate proportions of at least one alkyl ester of an unsaturated monocarboxylic acid and/or at least one vinyl ester of a saturated monocarboxylic acid, diisobutylene and at least one diacid, lower alkyl diester or anhydride form of an $\alpha,\beta$-unsaturated dicarboxylic compound; followed by condensation of the resultant copolymer with said at least one compound having a primary amine function and having the formula (I), in a proportion of at least 0.5 mole of amine (I) per mole of $\alpha,\beta$-unsaturated dicarboxylic compound in the copolymer.

11. A composition according to claim 10, wherein the proportion of said compound having a primary amine function and having the formula (I) is from 0.9 to 1.1 mole per mole of $\alpha,\beta$-unsaturated dicarboxylic compound in the copolymer.

12. A composition according to claim 1, which is obtained by radical copolymerization of appropriate proportions of at least one alkyl ester of an unsaturated monocarboxylic acid and/or at least one vinyl ester of a saturated monocarboxylic acid, diisobutylene and at least one α,β-unsaturated dicarboxylic compound which is an N-substituted imide obtained by the prior reaction of an α,β-unsaturated dicarboxylic compound with at least one compound having a primary amine function and having said formula (I).

13. A middle distillate composition, which comprises a major proportion of a middle distillate having a distillation range between 150° and 450° C. and a minor proportion, sufficient to decrease the cloud point, of at least one composition according to claim 1.

14. A middle distillate composition according to claim 13, wherein said middle distillate is a gas oil cut having a distillation interval ranging from an initial temperature of 160° to 190° C. to a final temperature of 350° to 390° C.

15. A middle distillate composition according to claim 13, wherein the proportion of said composition is from 0.001 to 1% by weight.

16. A middle distillate composition according to claim 15, wherein the proportion of said composition is from 0.01 to 0.2% by weight.

* * * * *